Feb. 24, 1970     E. L. BARCUS     3,497,292
NON-GLARE MIRROR
Filed May 22, 1967

INVENTOR.
Edward L. Barcus
BY
E. J. Bishop
ATTORNEY

United States Patent Office 3,497,292
Patented Feb. 24, 1970

3,497,292
NON-GLARE MIRROR
Edward L. Barcus, Anderson, Ind., assignor to General Motors Corporation, Detroit, Mich., a corporation of Delaware
Filed May 22, 1967, Ser. No. 640,072
Int. Cl. G02b 17/00
U.S. Cl. 350—281                   5 Claims

ABSTRACT OF THE DISCLOSURE

An anti-glare rear view mirror that is selectively actuated between a "day" and "night" position by rotating a horizontally supported roller located on the rear face of the mirror housing. The roller acts through a rack and pinion arrangement to drive a block between detent positions so as to pivot the mirror housing with respect to the mirror support and present the desired reflective surface for viewing.

---

Rear view mirrors are currently available that move between "day" and "night" positions by selectively pivoting the mirror housing with respect to the mirror support so as to obtain the desired reflective surface for viewing. The pivotal movement is usually achieved by an actuator located adjacent the bottom surface of the mirror housing and by rotating a vertically extending knob, flipping of a lever, or depressing of rocker arm, all of which act through a suitable interior mechanism, a plate pivots with respect to the mirror support arm to change the viewing angle. While performing their intended function satisfactorily in most instances, the downwardly projecting actuators cannot be readily contoured into the mirror housing. Because of their visible frontal location, the actuators must be decoratively, in addition to functionally, designed if the viewed mirror unit is to have an aesthetically appealing configuration.

The present invention uses a cylindrical roller actuator that is horizontally and vertically supported in a plane parallel to the reflecting surfaces of the prismatic mirror and recessed into the rear face of the housing. The rearward location permits the actuator to be functionally designed for a large and easily accessible grasping area in a location convenient to the operator while, because of its cylindrical shape, allowing the roller to be easily contoured and blended into the rear surface of the mirror housing. The rearward location of the mirror also permits the designer to use a standard adjusting mechanism for a wide range of mirror unit configurations thereby allowing a styling that is not compromised by actuator considerations. In operation, the roller through a rack and pinion arrangement drives slidable blocks vertically between detent positions in channels integrally formed in a yieldable plate that is, in turn, supported by the vehicle. The block is shaped so that the distance between the housing and the yieldable plate changes as the block travels vertically, thereby pivoting the mirror between the desired positions.

Accordingly, the objects of the present invention are: to provide an anti-glare rear view mirror that may be easily adjusted between "day" and "night" viewing positions by the rotation of a roller mounted horizontally on the rear face of the mirror housing; to provide a "day" and "night" anti-glare rear view mirror that may be selectively adjusted by the rotation of a rearwardly located roller that causes a slidable block to move vertically between detents thereby tilting the mirror housing to present the desired mirror reflecting surface for viewing; and to provide an easily and conveniently adjustable anti-glare mirror that is adaptable to a wide range of exterior configurations without necessitating an alteration of the adjusting mechanism.

These and other objects will be apparent to one skilled in the art upon reading the following detailed description, reference being made to the accompanying drawings in which.

Figure 1:
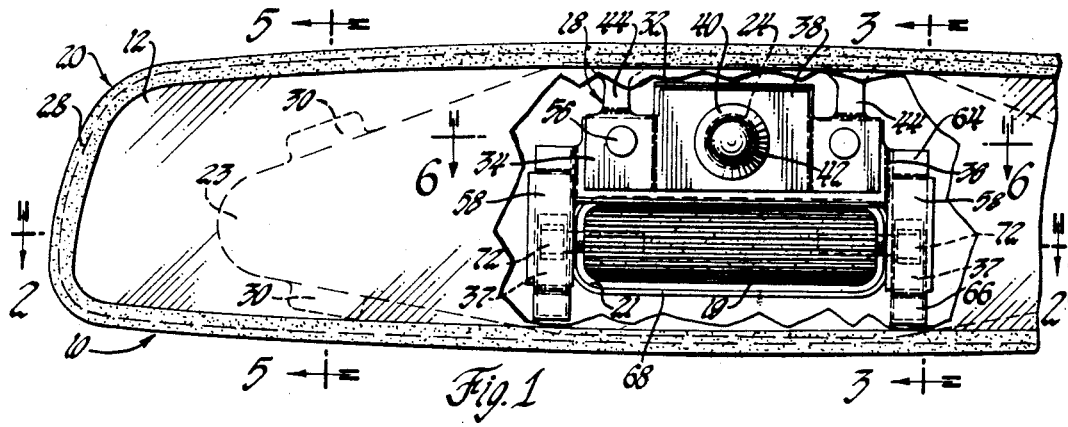
FIGURE 1 is a partial front view of the rear view mirror made in accordance with the present invention.
Figure 2:
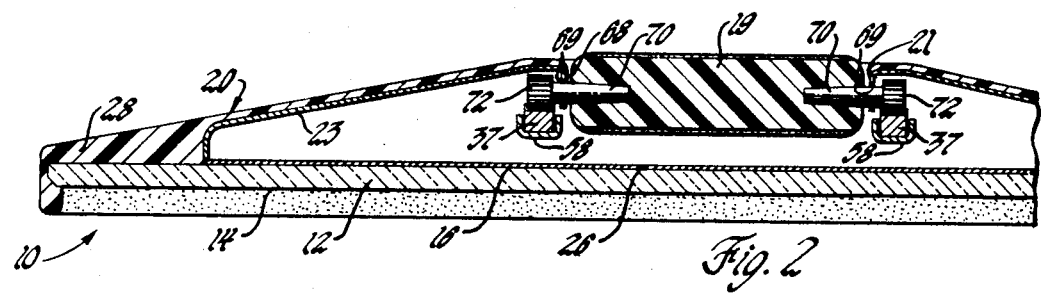
FIGURE 2 is a view taken along line 2—2 of FIGURE 1.

Referring to the drawings, there is shown an anti-glare rear view mirror unit 10 comprising a conventional prismatic mirror 12 having reflecting surfaces 14 and 16 of different reflective powers, an adjusting mechanism 18 including an adjusting roller 19, a housing 20 and a support 22 having one end adapted for connection to a vehicle in the usual manner.

The mirror housing 20 comprises a cup shaped shell 23 that has an aperture 24 formed in the rear face through which the support 22 extends into the housing interior and includes a rectangular slot 21 that receives the adjusting roller 19. When the adjusting mechanism 18 has been secured to the inside of the shell 23, as will be described more fully below, a front plate 26 having a shape corresponding to the frontal projection of the shell 23 is fastened thereto by tab portions 30. The assembly thus formed is then located on the rear surface of the mirror 12 and a covering 28 of rubber or other suitable elastomeric material is molded around the periphery of the mirror 12 and over the shell member 23 to form a tightly secured mirror unit 10. As should be apparent, the mirror 12 and the covering 28 can be shaped to achieve a desired exterior design without requiring a modification of either the adjusting mechanism 18 or the shell 23.

The adjusting mechanism 18 comprises a yieldable plate member 32 including a spring bar 34 and a mounting plate 36, a pair of slidable blocks 37 and the adjusting roller 19. The spring bar 34 is formed of a metal stamping and includes a rectangular base portion 38 having a rearwardly opening parti-spherical rocket 40 formed therein that embraces the forward portion of a ball end 42 formed on the support 22. Formed at the upper end of the base portion 38 are laterally spaced spring fingers 44 that include a vertically extending leg 46, a bending or flex section 48 and an inclined leg 50 that is rigidly attached to the shell 23 by rivets 52 or other suitable fastening means. At this point, it should be noted that bending section 48 hinges the housing 20 for pivotal movement about a horizontal axis relative to the yieldable plate member 32. The mounting plate 36 is formed of sheet metal and includes a forwardly opening parti-spherical socket 54 adapted to embrace the rear portion of end 42. The mounting plate 36 is fixedly attached by suitable means as indicated at 56 to the spring bar 34 and, in the assembled position, the sockets 40 and 54 frictionally embrace the ball end 42 while at the same time permitting universal pivotal adjustment of the housing 20 about the support 22.

Formed at the sides of the mounting plate 36 and facing rearwardly of the mirror 12 are generally U-shaped bearing channels 58 comprising guide walls 60, a bearing surface 62 and detends 64 and 66. Inwardly facing flanges 68 are formed at the outward edges of the slot 21 and include horizontally aligned holes 69 that rotatably support diecast or molded plastic shafts 70 having integrally formed outwardly mounted pinions 72. The shafts 70 are axially secured to the adjusting roller 19 so that the pinions 72 are located opposite the channels 58. The slidable blocks 37 are interposed between the channels 58 and the pinions 72 and each block 37 has a rack portion 76 that drivingly engages the pinion 72 so that rotation of the roller 19 will cause a corresponding vertical movement of the block 37 along bearing surface 62. Projections 78 and 80 are formed on the block opposite the rack portion 76 and have a height differential such that the housing 20 will be pivoted relative to the mounting plate sufficient to present the other of the reflecting surfaces for viewing as the block 37 travels vertically between detent positions. In this particular embodiment, the prismatic mirror has an included angle of 3°50′ between reflecting surfaces that requires a 5° angular movement of the mirror 12 relative to the reflecting surface 16 for correct "day" and "night" alignment. To insure proper operation of the adjusting mechanism, it should be noted that the yieldable plate member 32 and, in particular, the spring fingers 44 are formed so that bearing surface 62 continuously urges block 37 into engagement with pinion 72 while at the same time having sufficient flexibility so that the mechanism can be easily moved between "day" and "night" positions.

In the described embodiment, each slidable block 37 has two projections 78 and 80 that cooperate with two corresponding detents 64 and 66 formed in the channel 58. However, one skilled in the art will readily recognize that either singly or in pairs other variations are possible which are mechanically equivalent to the projection and detent arrangement described above. For instance, the slidable block 37 could by proper design have a single projection that cooperates with two detents formed in the yieldable plate member 32 or may have two projections that cooperate with a single detent. Also, the projections may be formed on the mounting plate 36 and the detents formed in the slidable block 74.

Figures 3, 4, 5:
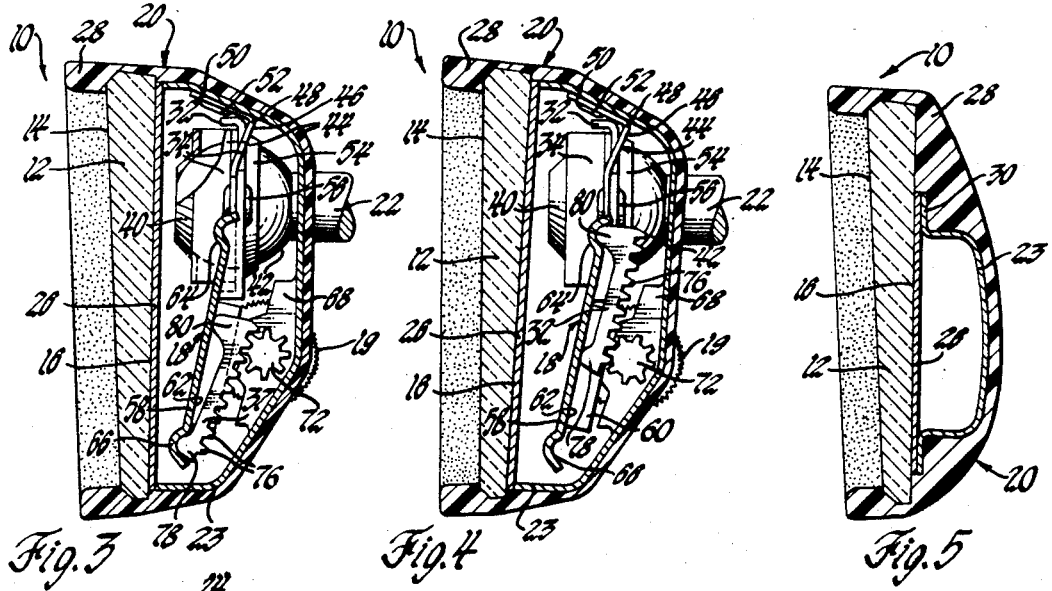
FIGURE 3 is a view taken along line 3—3 of FIGURE 1 showing the adjusting mechanism in the "day" viewing position.
FIGURE 4 is a view similar to FIGURE 3 showing the adjusting mechanism in the "night" viewing position.
FIGURE 5 is a view taken along line 5—5 of FIGURE 1.
Figure 6:
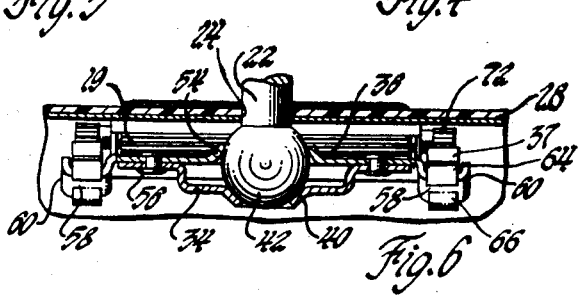
FIGURE 6 is a view taken along line 6—6 of FIGURE 1.

FIGURE 3 shows the mirror unit in the "day" position wherein reflecting surface 14 is presented for viewing. In this position, projections 78 are located in detents 66 while projections 80 engage bearing surfaces 62. To change to a "night" viewing position wherein adjusting mechanism 18 is presented for viewing, as shown in FIGURE 4, the operator rotates the roller 19 clockwise thereby moving slidable block 37 upwardly in the channel 58 until additional rotation is resisted by projection 80 engaging detent 58 causing housing 20 and mirror 12 to pivot relative to the yieldable plate member 32 and support 22 about the bending section 48.

What is claimed is:
1. An anti-glare rear view mirror comprising a housing in which there is positioned a mirror having two reflecting surfaces of different reflective powers, an aperture in said housing through which a support extends into the interior thereof, plate means including a bearing surface hingedly connected to said housing and universally pivotally mounted on said support such that said housing is pivotable about a first horizontal axis relative to said bearing surface, detent means formed in the bearing surface, a block vertically movable along the bearing surface and having a pair of projections engageable with said detent means, one of said projections being engageable with said detent means to pivot said bearing surface in one direction relative to said housing to present one of said reflecting surfaces for viewing, the other of said projections being engageable with said detent means to pivot said bearing surface in the opposite direction relative to said housing to present the other of said reflecting surfaces for viewing, a roller supported by said housing for rotation about a second horizontal axis parallel to said first horizontal axis, and means operatively associated with said roller for vertically moving the block to selectively engage said projections with said detent means as the roller is rotated.

2. The invention as recited in claim 1 wherein said means operatively associated with said roller includes a pinion axially connected to the roller and a rack formed on the block that drivingly engages said pinion.

3. An anti-glare rear view mirror comprising a housing in which there is positioned a mirror having two reflecting surfaces of different reflective powers, an aperture in said housing through which a support extends into the interior thereof, a spring bar including a base portion and laterally spaced flexible spring fingers attached to the housing, said spring fingers hinging the housing for pivotal movement relative to the base portion about a horizontal axis, a socket formed in the base portion and embracing a portion of the support, a mounting plate secured to the base portion including a socket opposed to said first mentioned socket and engaging another portion of the support, said first mentioned socket and said second mentioned socket cooperating to frictionally and adjustably embrace the support, a vertically orientated channel formed integrally with the mounting plate including detent means, a block received within the channel and vertically movable therein, a pair of projections formed on the block and engageable with the detent means, one of the projections engageable with said detent means to pivot the housing in one direction relative to the mounting plate about said horizontal axis to present one of said reflecting surfaces for viewing, the other of said projections engageable with said detent means to pivot the housing relative to the mounting about said horizontal axis to present the other of the reflecting surfaces for viewing, a cylindrical roller horizontally and rotatably supported on the rear face of the housing, a rack formed on said block, and a pinion axially connected to the roller and drivingly engaging the rack whereby the roller may be selectively rotated to control the pivotal movement of the housing and mirror.

4. An anti-glare rear view mirror comprising a housing in which there is positioned a mirror having two reflecting surfaces of different reflective powers, a support, plate means mounted on said support and pivotally connected to said housing for supporting the latter for rotation about a first horizontal axis, an actuator mounted on said housing for rotation about a second horizontal axis parallel to said first horizontal axis, a pinion operatively connected to said actuator, and vertically shiftable means operatively connected between and relatively movable with respect to said actuator and said plate means, said vertically shiftable means having a rack formed thereon which drivingly engages said pinion, the arrangement being such that manual rotation of said actuator drives said vertically shiftable means so as to cause said mirror to move about said first horizontal axis between a "day" position in which one of said reflecting surfaces is presented for viewing and a "night" position in which the other of said reflecting surfaces is presented for viewing.

5. The invention as recited in claim 4 wherein said vertically shiftable means are slidable within a vertically extending channel formed on said plate means.

References Cited
UNITED STATES PATENTS

| 2,607,906 | 8/1952 | Sang | 350—279 |
|---|---|---|---|
| 2,843,017 | 7/1958 | Ponce | 350—281 |
| 3,253,510 | 5/1966 | Clayton | 350—281 |

FOREIGN PATENTS 527,081  10/1954  Belgium.

PAUL R. GILLIAM, Primary Examiner

U.S. Cl. X.R.

350—279